United States Patent
Tai et al.

(10) Patent No.: US 11,448,907 B2
(45) Date of Patent: Sep. 20, 2022

(54) BONDED BODIES FOR OPTICAL MODULATORS, OPTICAL MODULATORS AND A METHOD OF PRODUCING BONDED BODIES FOR OPTICAL MODULATORS

(71) Applicant: NGK INSULATORS, LTD., Nagoya (JP)

(72) Inventors: Tomoyoshi Tai, Inazawa (JP); Yudai Uno, Nagoya (JP); Jungo Kondo, Miyoshi (JP); Yoshimasa Kobayashi, Nagoya (JP); Tatsuya Hishiki, Nagoya (JP); Hiroharu Kobayashi, Kasugai (JP)

(73) Assignee: NGK INSULATORS, LTD., Nagoya (JP)

( * ) Notice: Subject to any disclaimer, the term of this patent is extended or adjusted under 35 U.S.C. 154(b) by 56 days.

(21) Appl. No.: 17/061,955

(22) Filed: Oct. 2, 2020

(65) Prior Publication Data
US 2021/0103164 A1 Apr. 8, 2021

(30) Foreign Application Priority Data
Oct. 4, 2019 (JP) .............................. JP2019-183583

(51) Int. Cl.
*G02F 1/035* (2006.01)

(52) U.S. Cl.
CPC .......... *G02F 1/035* (2013.01); *G02F 2202/20* (2013.01)

(58) Field of Classification Search
CPC ............... G02F 1/035; G02F 2202/20

USPC .......................................................... 385/1–3
See application file for complete search history.

(56) References Cited

U.S. PATENT DOCUMENTS

| 5,408,566 A * | 4/1995 | Eda .................... G02B 6/122 |
| | | 385/131 |
| 2014/0210317 A1* | 7/2014 | Tai ..................... H01L 41/053 |
| | | 310/348 |
| 2017/0160450 A1* | 6/2017 | Asai ..................... H01S 5/141 |
| 2020/0285131 A1* | 9/2020 | Marandi .................. G02F 1/39 |
| 2021/0226603 A1* | 7/2021 | Iwamoto ............... H01L 41/047 |

FOREIGN PATENT DOCUMENTS

| JP | 6418121 A | 1/1989 |
| JP | 4667932 B2 | 10/2006 |
| JP | 2007182335 A | 7/2007 |
| JP | 2014147054 A | 8/2014 |
| JP | 201514716 A | 1/2015 |

OTHER PUBLICATIONS

European Search Report issued in corresponding European Application No. 20199651.9, dated Feb. 24, 2021 (6 pages).

* cited by examiner

*Primary Examiner* — Robert Tavlykaev
(74) *Attorney, Agent, or Firm* — Flynn Thiel, P.C.

(57) ABSTRACT

A bonded body for an optical modulator includes a supporting substrate, an optical waveguide material provided on the supporting substrate and composed of lithium niobate, lithium tantalate and lithium niobate-lithium tantalate, and an optical waveguide in the optical waveguide material. The supporting substrate is composed of a material selected from the group consisting of magnesium oxide and a magnesium-silicon composite oxide.

8 Claims, 4 Drawing Sheets

BONDED BODIES FOR OPTICAL MODULATORS, OPTICAL MODULATORS AND A METHOD OF PRODUCING BONDED BODIES FOR OPTICAL MODULATORS

CROSS-REFERENCE TO RELATED APPLICATIONS

This claims priority from JP 2019-183583, filed Oct. 4, 2019, the entire contents of which are hereby incorporated by reference.

TECHNICAL FIELD

The present invention relates to a bonded body for an optical modulator, an optical modulator and a method of producing the bonded body for the optical modulator.

BACKGROUND ARTS

An optical modulator obtained by bonding an optical waveguide substrate made of lithium niobate onto a supporting substrate is known. According to patent document 1, a lithium niobate substrate and a low dielectric substrate are bonded through an organic substance or a low melting point glass. According to patent document 2, an optical waveguide substrate of lithium niobate is bonded onto a supporting substrate of lithium niobate or lithium tantalate through a bonding layer. According to patent document 3, an epitaxial film of lithium niobate is grown on a single crystal substrate of silicon or sapphire and then utilized as a substrate for an optical waveguide.

RELATED DOCUMENTS

Patent Documents (Patent document 1) Japanese patent publication No. H01-018121 A
(Patent document 2) Japanese Patent No. 4667932 B
(Patent document 3) Japanese patent publication No. 2015-014716A

SUMMARY OF THE INVENTION

For example, an optical waveguide composed of lithium niobate crystal with titanium diffused therein is produced by depositing titanium metal film on a lithium niobate crystal substrate, followed by thermal diffusion at a temperature of about 1000° C. for several hours. As the crystallinity of the lithium niobate crystal is deteriorated during the processing, it is necessary to perform an annealing process at 600 to 1000° C. for improving the deteriorated crystallinity. However, as the difference of thermal expansion between the lithium niobate substrate and supporting substrate is large, a fracture occurs during the annealing process at such high temperature.

Further, there is a limit on the optical response characteristics (bandwidth) of the optical modulator with respect to frequency due to the matching of the lithium niobate substrate and supporting substrate.

An object of the present invention is, in an optical modulator and a bonded body for the optical modulator obtained by bonding an optical waveguide material of lithium niobate or the like onto a supporting substrate, to suppress the cracks of the optical waveguide material caused by annealing process and to improve the optical response characteristics of the optical modulator with respect to frequency.

The present invention provides a bonded body for an optical modulator, the bonded body comprising:
a supporting substrate;
an optical waveguide material provided on the supporting substrate and comprising a material selected from the group consisting of lithium niobate, lithium tantalate and lithium niobate-lithium tantalate; and
an optical waveguide in the optical waveguide material,
wherein the supporting substrate comprises a material selected from the group consisting of magnesium oxide and a magnesium-silicon composite oxide.

The present invention further provides an optical modulator comprising:
the bonded body for the optical modulator; and
an electrode provided on the optical waveguide material and modulating a light propagating in the optical waveguide.

The present invention further provides a method of producing a bonded body for an optical modulator, said method comprising the steps of:
bonding a supporting substrate comprising a material selected from the group consisting of magnesium oxide and a magnesium-silicon composite oxide and an optical waveguide material comprising a material selected from the group consisting of lithium niobate, lithium tantalate and lithium niobate-lithium tantalate; and
providing an optical waveguide in said optical waveguide material.

According to the present invention, in an optical modulator and a bonded body for the optical modulator obtained by an optical waveguide material of lithium niobate or the like onto a supporting substrate, cracks of the optical waveguide material due to annealing can be suppressed and the optical characteristics of the optical modulator with respect to frequency can be improved.

EMBODIMENTS FOR CARRYING OUT THE INVENTION

Figure 1A:
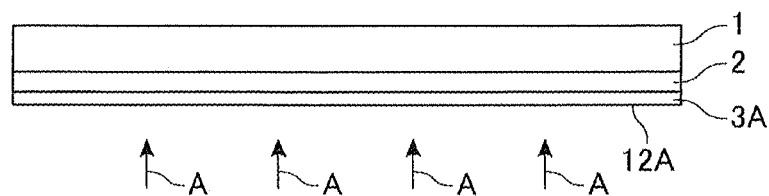
FIG. 1(a) shows the state that an intermediate layer 2 and first oxide film 3A are provided on an optical waveguide material 1.
Figure 1B:
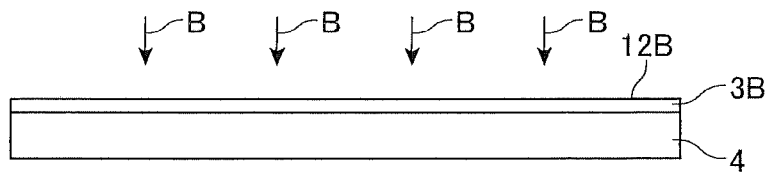
FIG. 1(b) shows the state that a second oxide film 3B is provided on a supporting substrate 4.
Figure 1C:
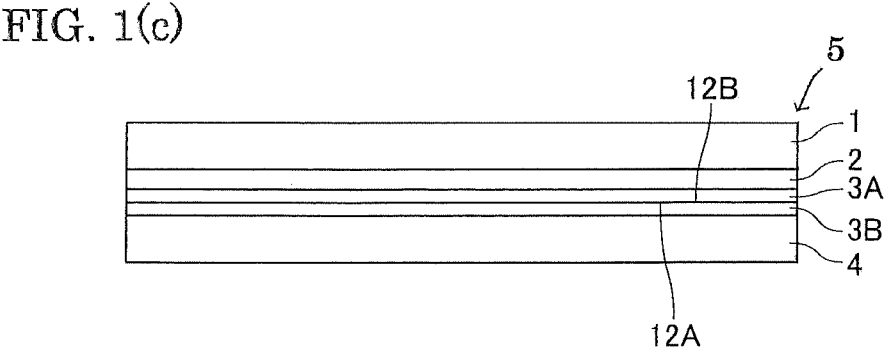
FIG. 1(c) shows a bonded body 5 of the supporting substrate 4 and optical waveguide material 1.

FIGS. 1 and 2 show an optical modulator and a bonded body for the optical modulator according to an embodiment of the present invention.

As shown in FIG. 1(a), it is provided a first oxide film 3A on an optical waveguide material 1 through an intermediate layer 2. A neutralized atomic beam is irradiated onto a surface of a first oxide film 3A, depicted by arrow A, to provide an activated surface 12A. Further, as shown in FIG.

1(b), a second oxide film 3B is provided on a supporting substrate 4. A neutralized atomic beam is irradiated onto a surface of a second oxide film 3B, depicted by arrow B, to provide an activated surface 12B. Then, the activated surface 12A of the first oxide film 3A and activated surface 12B of the second oxide film 3B are contacted and directly bonded with each other to obtain a bonded body shown in FIG. 1(c). The first oxide film and second oxide film are integrated to form a bonding layer.

Figure 2A:
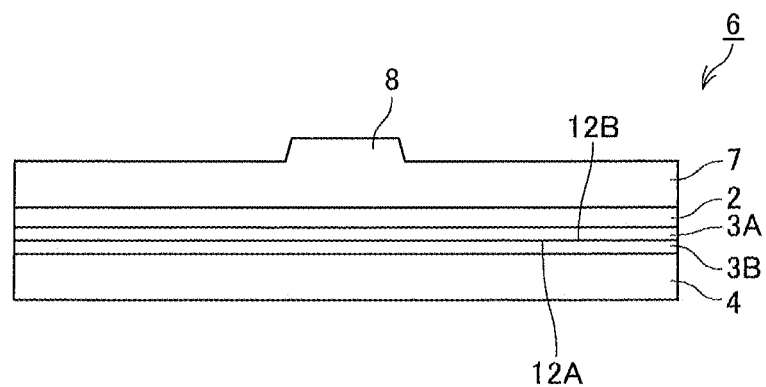
FIG. 2(a) shows the state that a ridge-type optical waveguide 8 is formed on the optical waveguide material 7.

Then, as shown in FIG. 2(a), an optical waveguide material 7 having a ridge part 6 is obtained by processing the optical waveguide material 1. Here, the ridge part 8 may be made as a ridge-type optical waveguide, or metal ions or protons may be further diffused into the ridge part 8 by metal diffusion or a proton exchange method to generate an optical waveguide. Part number 6 represents a bonded body for an optical modulator. Further, the optical waveguide may be generated only through the diffusion of the metal ions or protons.

Figure 2B:
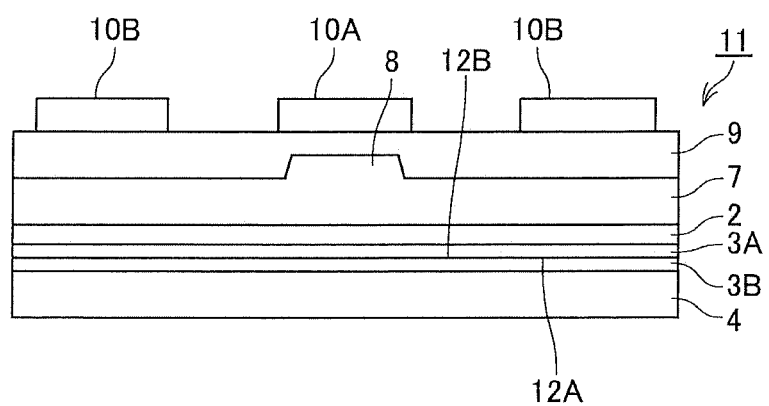
FIG. 2(b) shows the state that modulation electrodes 10A and 10B are formed on an optical modulator 11.

As shown in FIG. 2(b), modulation electrodes 10A and 10B are formed on the optical waveguide material 7 through a buffer layer 9 to obtain an optical modulator 11. According to the present example, as the optical waveguide material is composed of a Z-plate, the electrodes 10A are formed directly above the optical waveguide 8. However, the position of the electrode is appropriately changed depending on the embodiment of the optical waveguide material.

The buffer layer 9 may be omitted in the case that an X-plate is used.

Figure 3A:
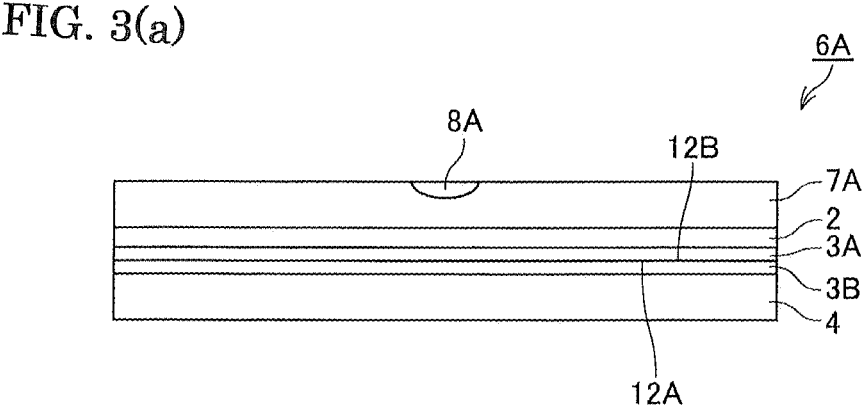
FIG. 3(a) shows a bonded body 6A of the supporting substrate 4 and an optical waveguide material 7A.
Figure 3B:
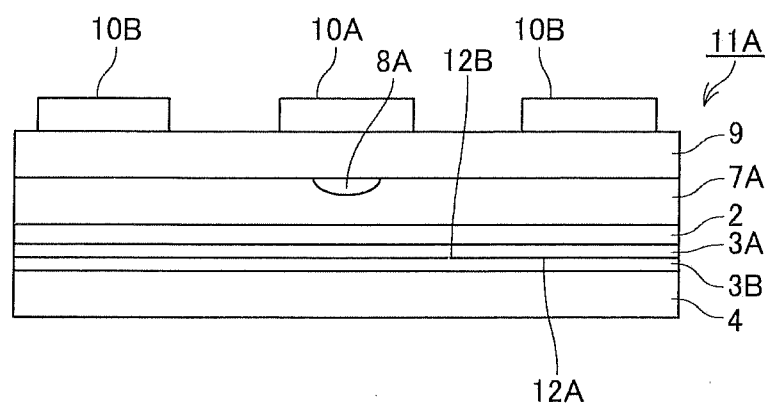
FIG. 3(b) shows an optical modulator 11A.

Further, according to an embodiment of FIG. 3, metal-diffusion or proton exchange optical waveguide 8A is formed on the optical waveguide material to obtain an optical waveguide material 7A and a bonded body 6A for an optical modulator, as shown in FIG. 3(a). However, according to the present example, the first oxide film 3A and second oxide film 3B are directly bonded with each other. The first oxide film and second oxide film are integrated to form a bonding layer. Further, a ridge part is not provided in the optical waveguide 8A. As shown in FIG. 3(b), modulating electrodes 10A and 10B are formed on the optical waveguide material 7A through the buffer layer 9 to obtain an optical modulator 11A.

The respective constituents of the present invention will be described further.

The material of the supporting substrate is made from a material selected from the group consisting of magnesium oxide and a magnesium-silicon composite oxide. Magnesium oxide may be single crystal or polycrystal. Further, the magnesium-silicon composite oxide is a composite oxide of a magnesium atom, silicon atom and oxygen atom, and may preferably be steatite ($MgSiO_3$), forsterite ($Mg_2SiO_4$) or a mixture thereof, as a stable crystalline composition.

The relative density of the material forming the supporting substrate may preferably be 90% or higher and may be 100%. Further, although the method of producing the supporting substrate is not particularly limited, it is preferred to improve the relative density by pressurized sintering method.

The thickness of the optical waveguide material may preferably be 0.05 to 5 µm, and is more preferably 0.1 to 1.0p m, for propagation efficiency of the optical waveguide.

The material forming the optical waveguide material is made from a material selected from the group consisting of lithium niobate, lithium tantalate and lithium niobate-lithium tantalate. These materials are compatible with magnesium oxide or the magnesium-silicon composite oxide forming the supporting substrate, so that it is possible to suppress the cracks during annealing (or film-formation of the optical waveguide material) and to provide wider bandwidth.

The material forming the optical waveguide may preferably be expressed by $Li_xAO_z$ (A is Nb, Ta), wherein x represents 0.9 to 1.05 and z represents 2.8 to 3.2. Further, 10% or less of Li and A may be replaced with other elements, such as K, Na, Rb, Cs, Be, Mg, Ca, Sr, Ba, Ti, Zr, Hf, V, Cr, Mo, W, Fe, Co, Ni, Zn, Sc, Ce or the like, and the combination of two or more is permissible.

The optical waveguide provided in the optical waveguide material may be so-called ridge-type optical waveguide or metal-diffusion optical waveguide or proton exchange optical waveguide. Preferably, the diffusion type optical waveguide is formed in the ridge part by metal diffusion or proton exchange to strengthen the confinement of the light.

An intermediate layer having a dielectric constant lower than that of the optical waveguide material on the surface of the optical waveguide material is provided, so that the confinement of light within the optical waveguide can be made stronger. The material of the intermediate layer may preferably be silicon oxide. Further, the thickness of the intermediate layer may preferably be 2.0 to 15 µm and more preferably 4.0 to 10 µm.

According to a preferred embodiment, a first oxide film is provided on the optical waveguide material 1, a second oxide film is provided on the supporting substrate, a surface of the first oxide film and a surface of the second oxide film are activated by neutralized atomic beam, respectively, and the respective activated surfaces are directly bonded with each other. Further, the optical waveguide material 1 and second oxide film may be directly bonded with each other, the supporting substrate and first oxide film may be directly bonded with each other, and the optical waveguide material 1 and supporting substrate may be directly bonded with each other. The first oxide film and second oxide film are integrated with each other to form a bonding layer.

In the surface activation by the neutralized atomic beam, preferably, the respective surfaces to be bonded are flattened to obtain flat surfaces. Here, the method of flattening the respective surfaces includes lapping and chemical mechanical polishing (CMP) or the like. Further, the flattened surface may preferably have Ra of 1 nm or lower and is more preferably 0.3 nm or lower.

For removing residues of a polishing agent and processed denatured layer, the respective surfaces are cleaned. The method of cleaning the surfaces may be wet cleaning, dry cleaning, scrub cleaning or the like, and scrub cleaning is preferred for obtaining clean surfaces simply and efficiently. "Sun Wash LH540" as the cleaning agent is particularly preferred to perform the cleaning, using a mixed solution of acetone and IPA by means of a scrub cleaning machine.

Then, a neutralized beam is irradiated onto the respective surfaces to activate the respective surfaces.

In the case that the surface activation is performed by the neutralized beam, a high-speed atomic beam source of saddle-field type is used. Then, an inert gas is introduced into a chamber, and a high voltage is applied on an electrode from a direct current electric power source. Electrons e are thereby moved responsive to an electric field of saddle field type generated between the electrode (positive electrode) and housing (negative electrode) to generate beams of atoms and ions of the inert gas. Among the beams reaching a grid, the ion beams are neutralized at the grid so that the beams of neutral atoms are emitted from the high-speed atomic beam source. The atomic species forming the beams may preferably be an inert gas (argon, nitrogen or the like).

The voltage and current during the activation by the beam irradiation are preferably 0.5 to 2.0 kV and 50 to 200 mA, respectively.

Then, the activated surfaces are contacted and bonded with each other under vacuum atmosphere. The temperature during this step is ambient temperature, specifically and preferably being 40° C. or lower and more preferably 30° C. or lower. Further, the temperature at the time of bonding is more preferably 20° C. or higher and 25° C. or lower. The pressure during the bonding is preferably 100 to 20000N.

The first oxide film and second oxide film are provided for improving the bonding strength by the direct bonding. The material of each of the oxide films (material of the bonding layer) may preferably be a material selected from the group consisting of silicon oxide, magnesium oxide, alumina, tantalum pentoxide, titanium oxide and niobium pentoxide.

Further, the thickness of each of the first oxide film and second oxide film may preferably be 2.0 μm or less, more preferably 1.0 μm or less, and most preferably 0.5 μm or less. Further, the thickness of each of the first oxide film and second oxide film is preferably 0.01 μm or larger.

Although the method of film-forming the intermediate layer, first oxide film or second oxide film is not limited, sputtering, chemical vapor deposition (CVD) and vapor deposition methods may be used.

The optical waveguide material may have a shape of a substrate as shown in FIGS. 1 to 3. Alternatively, the optical waveguide material may be formed on the supporting substrate by film-formation. In this case, sputtering, CVD and MOCVD (organic metal vapor deposition method) are exemplified as the method of the film-formation, and a single crystal film or orientated film may be formed. Such single crystal film or orientated film may be utilized as the optical waveguide material.

EXAMPLES

Inventive Example 1

An optical modulator was produced according to the method described referring to FIGS. 1 and 2.

Specifically, an optical waveguide material 1 composed of lithium niobate single crystal was prepared. The optical waveguide material was made of an X-plate. Then, on the optical waveguide material 1, an intermediate layer 2 composed of silicon oxide and first oxide film 3A composed of amorphous silicon oxide were film-formed by sputtering in this order. The thickness of the first oxide film 3A was 50 nm.

Further, on a supporting substrate 4 composed of magnesium oxide, a second oxide film 3B composed of amorphous silicon oxide was film-formed by sputtering. The thickness of the second oxide film 3B was 50 nm.

The respective surfaces of the respective oxide films were then subjected to chemical mechanical polishing (CMP) until the film thickness was 20 to 40 nm and Ra was 0.08 to 0.4 nm.

Then, a neutralized atomic beam was irradiated onto the surface of the first silicon oxide film and surface of the second silicon oxide film to activate and directly bond the surfaces.

Specifically, the respective surfaces were cleaned to remove the contamination, followed by incorporation into a vacuum chamber. The chamber was evacuated to the order of $10^{-6}$ Pa, and the high-speed atomic beam (acceleration voltage of 1 kV and Ar flow rate of 27 sccm) was irradiated onto the respective surfaces for 120 seconds to activate the respective surfaces to provide the activated surfaces. Then, after the activated surface of the first oxide film and activated surface of the second oxide film were contacted with each other, they were bonded by pressurizing at 10000 N for 2 minutes.

Figure 4:
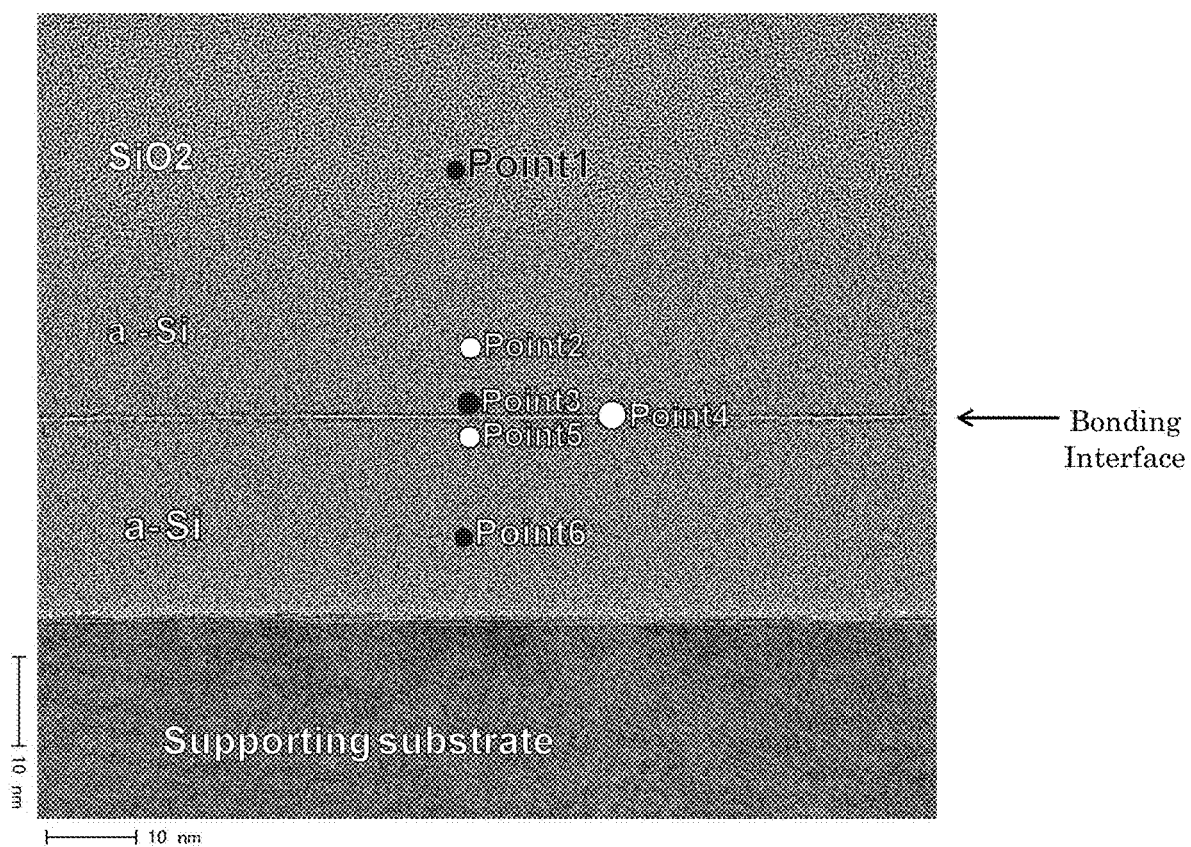
FIG. 4 is a photograph showing a cross section of an essential part of a bonded body.

Further, FIG. 4 shows a photograph of a cross section of an essential part of the bonded body (magnification of 2,000,000 by a transmission type electron microscope). The photograph shows the supporting substrate, the second silicon oxide film, the direct bonding interface, first silicon oxide film and intermediate layer (silicon oxide) from the bottom in the order. Further, the results of measurement of composition ratios at the respective points are shown in Table 1.

Then, the ridge part 8 was patterned on the optical waveguide material 1 by the procedure of photolithography using a resist, and the dry etching of the optical waveguide material 1 was performed by a milling system. The milling system used was "RF-350" supplied by Veeco and used under the conditions of a beam voltage of 300 to 700 V and beam current of 300 to 800 mA. Then, the resist part was peeled off by an organic solvent to form a ridge part having a height of 0.4 μm, a width of 2 μm and a length of 20 mm.

A titanium metal film was then deposited on the ridge part and subjected to thermal diffusion at 1000° C. for 10 hours to form a titanium diffusion optical waveguide. Then, an annealing process was performed at 650° C.

The presence or absence of cracks of the thus obtained bonded body was observed by visual evaluation.

Further, electrodes 10A and 10B were formed on the bonded body to measure the optical characteristics (bandwidth). Specifically, the optical response characteristics (dB) of the optical modulator with respect to frequency were measured, and the frequency at a reduction of 3 db was defined as the bandwidth. The optical response characteristics were measured using an optical component analyzer "HP8530" in a frequency of 0 to 50 GHz. The results are shown in Table 2.

TABLE 1

|  | Si | O | Ar |
| --- | --- | --- | --- |
| Point 1 | 44.6 | 54.8 | 0.6 |
| Point 2 | 92.2 | 7.4 | 0.5 |
| Point 3 | 88.4 | 8.4 | 3.2 |
| Point 4 | 89.7 | 8.1 | 2.2 |
| Point 5 | 90.7 | 6.6 | 2.7 |
| Point 6 | 94.5 | 4.9 | 0.6 |

Inventive Example 2

The optical modulator and the bonded body for the optical modulator were obtained according to a similar procedure as Inventive Example 1, and the presence or absence of cracks and the bandwidth were measured.

Further, according to the present example, the supporting substrate was formed of forsterite ($Mg_2SiO_4$). Specifically, powdery raw materials of MgO and $SiO_2$ were weighed at a predetermined ratio and then mixed, calcined and ground to obtain a powdery mixture of forsterite ($Mg_2SiO_4$). Then, alumina ($Al_2O_3$) and a dispersing agent were added to the powdery mixture and mixed and dried in ethanol. Then, a binder and acetone were added to the thus obtained powdery mixture, which was then subjected to hot water drying and sieving to obtain a powder having a grain size of about 100 μm. Further, the powder was placed in a metal mold, and a column-shaped molded body of a wafer shape was molded using a uniaxial pressing machine. The molded body was then subjected to CIP processing (cold isostatic pressing process) and then sintered at a predetermined temperature (1300 to 1400° C.) to obtain a column-shaped supporting substrate composed of an oxide sintered body.

Inventive Example 3

The optical modulator and the bonded body for the optical modulator were obtained according to a similar procedure as Inventive Example 1, and the presence or absence of cracks and the bandwidth were measured.

However, according to the present example, the supporting substrate was formed of steatite ($MgSiO_3$). Specifically, powdery raw materials of MgO and $SiO_2$ were weighed at a predetermined ratio and then mixed, calcined and ground to obtain a mixed powder of steatite ($MgSiO_3$). Then, alumina ($Al_2O_3$) and a dispersing agent were added to the powdery mixture and mixed and dried in ethanol. Then, a binder and acetone were added to the thus obtained powdery mixture, which was then subjected to hot water drying and sieving to obtain a powder having a grain size of about 100 μm. Further, the powder was placed in a metal mold, and a column-shaped molded body of a wafer shape was molded using a uniaxial pressing machine. The molded body was then subjected to CIP processing (cold isostatic pressing process) and then sintered at a predetermined temperature (1300 to 1400° C.) to obtain a column-shaped supporting substrate composed of an oxide sintered body.

Comparative Example 1

The optical modulator and bonded body for the optical modulator were obtained according to a similar procedure as Inventive Example 1, and the presence or absence of cracks and the bandwidth were measured.

However, the material of the supporting substrate was made of glass (quartz glass). The other procedure was the same as that of Inventive Example 1.

Comparative Example 2

The optical modulator and bonded body for the optical modulator were obtained according to the same procedure as Inventive Example 1, and the presence or absence of cracks and the bandwidth were measured.

Further, the material of the supporting substrate was made from lithium niobate. The other procedure was the same as that of Inventive Example 1.

As can be seen from Table 2, according to the examples of the present invention, cracks during the annealing were not observed and the optical characteristics were good.

According to Comparative Example 1, as it used a supporting substrate made of glass, cracks during the annealing were observed.

According to Comparative Example 2, the bandwidth was shown to be inferior compared with those of the inventive examples.

The invention claimed is:

1. A bonded body for an optical modulator, said bonded body comprising:
    a supporting substrate;
    an optical waveguide material provided on said supporting substrate and comprising a material selected from the group consisting of lithium niobate, lithium tantalate and lithium niobate-lithium tantalate; and
    an optical waveguide in said optical waveguide material,
    wherein said supporting substrate comprises a material selected from the group consisting of steatite and forsterite, so as to provide an improved bandwidth of electro-optic modulation by the optical modulator.

2. The bonded body for the optical modulator of claim 1, further comprising a bonding layer between said supporting substrate and said optical waveguide material.

3. The bonded body for the optical modulator of claim 2, wherein said bonding layer comprises an oxide film.

4. An optical modulator comprising:
    the bonded body for the optical modulator of claim 1; and
    an electrode provided on said optical waveguide material and modulating a light propagating in said optical waveguide.

5. A method of producing a bonded body for an optical modulator, said method comprising the steps of:
    bonding a supporting substrate comprising a material selected from the group consisting of steatite and forsterite, so as to provide an improved bandwidth of electro-optic modulation by the optical modulator, and an optical waveguide material comprising a material selected from the group consisting of lithium niobate, lithium tantalate and lithium niobate-lithium tantalate; and
    providing an optical waveguide in said optical waveguide material.

6. The method of claim 5, further comprising the step of providing a bonding layer between said supporting substrate and said optical waveguide material.

7. The method of claim 5, further comprising the steps of:
    forming a first oxide film on said optical waveguide material;

TABLE 2

| | Optical waveguide substrate | Intermediate layer | Bonding layer | Supporting Substrate | Cracks during annealing (650° C.) | Optical characteristics (✕ Bandwidth) |
|---|---|---|---|---|---|---|
| Inventive Example 1 | X—LiNbO3 | SiO2 | α-Si/α-Si | MgO | None | 1.15 |
| Inventive Example 2 | X—LiNbO3 | SiO2 | α-Si/α-Si | Mg2SiO4 | None | 1.30 |
| Inventive Example 3 | X—LiNbO3 | SiO2 | α-Si/α-Si | MgSiO3 | None | 1.25 |
| Comparative Example 1 | X—LiNbO3 | SiO2 | α-Si/α-Si | glass | Present | — |
| Comparative Example 2 | X—LiNbO3 | SiO2 | α-Si/α-Si | LiNbO3 | None | 1 | forming a second oxide film on said supporting substrate; and directly bonding said first oxide film and said second oxide film.

8. The method of claim 7, further comprising the steps of:

irradiating a neutralized atomic beam on a surface of said first oxide film to provide a first activated surface; and irradiating a neutralized atomic beam on a surface of said second oxide film to provide a second activated surface, wherein said first activated surface and said second activated surface are directly bonded with each other.

* * * * *